United States Patent Office

Re. 27,835
Reissued Dec. 11, 1973

27,835

NONAQUEOUS ELECTROCHEMICAL CURRENT PRODUCING CELL HAVING SOLUBLE CATHODE DEPOLARIZER

Donald Leonard Maricle, Ridgefield, and Arthur Kentaro Hoffmann, New Canaan, Conn., by American Cyanamid Company, Stamford, Conn., assignee No Drawing. Original No. 3,578,500, dated May 11, 1971, Ser. No. 743,005, July 8, 1968. Application for reissue Nov. 29, 1971, Ser. No. 203,083
Int. Cl. H01m *17/00*
U.S. Cl. 136—6 LN 8 Claims

Matter enclosed in heavy brackets [ ] appears in the original patent but forms no part of this reissue specification; matter printed in italics indicates the additions made by reissue.

ABSTRACT OF THE DISCLOSURE

A primary and secondary electrochemical cell which comprises in combination an anode of a metal capable of reducing a cathode depolarizer, sulfur dioxide alone or in a co-solvent, an electrolyte salt, and soluble depolarizers.

This invention relates to electrochemical cells and batteries. More particularly, this invention relates to nonaqueous primary and secondary electrochemical cells and batteries having a novel and improved cathode depolarizer system which incorporates soluble depolarizers.

Cathode depolarizers are conventionally employed in a form which will permit intimate and maximum contact with an external electrical conduit, such as the wires connecting the electrodes of a cell or battery, while also effecting separation of the cathode depolarizer from the anode. Thus, in practice, the cathode depolarizer is generally an insoluble, finely divided solid admixed with or plated over an inert conducting material such as nickel, graphite or carbon rod. The mechanical separation of the cathode depolarizer material from the anode is necessary to prevent the chemical reaction of cathode depolarizer with anode material which, in effect, would discharge the battery internally without doing any useful work. For example, in the common Leclanche cell, the anode is zinc metal, the cathode is a porous carbon pencil, the cathode depolarizer is a mixture of manganese dioxide and acetylene carbon black, and the electrolyte is a mixture of ammonium chloride and zinc chloride gelled to a paste with corn starch and wheat flour. The cathode depolarizer mix is generally pressed around the carbon pencil which is centered in a cylindrical zinc anode casing and the electrolyte paste fills the cylindrical space between cathode depolarizer mix and outer zinc casing. Separation of cathode depolarizer and zinc anode is maintained by the essentially solid state of the cathode depolarizer mixture, by the electrolyte paste and by a separator of paper or similar material.

As examples of other cells requiring separation of anode and cathode depolarizer may be mentioned the mercury dry cell (HgO cathode depolarizer with ZnO-saturated KOH electrolyte and cellulosic separator), alkaline manganese dry cell (zinc/KOH/$MnO_2$), zinc mercury-carbon cell (mercury dioxysulfate as cathode depolarizer with special gel-coated separator next to the surrounding zinc can), and alkaline silver-zinc dry cell (similar to mercury cell but with $Ag_2O$ or AgO instead of HgO). In each of such cells the cathode depolarizer material is a solid which is finely distributed in a matrix to obtain the greatest possible surface area for optimum electrical contact, conductivity and reduction. The solid state of this material also serves to separate the anode from the cathode mix so as to eliminate or substantially reduce interaction with the anode. Mechanical separation is conventionally further enhanced by employing the cathode depolarizer as a powder, compact, compartmentalized solution or suspension, plating or glossy metal oxide film, and by utilizing a separator material such as starch paste, fibrous material such as cotton, dacron and nylon, alone or impregnated with resins, gels and the like.

Attempts have been made to modify such cells by the use of more active metals as anodes because of their higher potentials. However, in the case of active metals such as aluminum and magnesium, the electrolytes must be varied to control attack on these metals. It will be evident that a cell which not only eliminates the need for chemical separation of anode and cathode depolarizer but also utilizes an active metal such as lithium, sodium, potassium, aluminum or magnesium as the anode, without attack by cathode depolarizer or electrolyte, would provide high performance (watt-hours per pound) at minimum expense.

An object of the present invention is to provide a new and improved primary or secondary cell which avoids the need for chemical separation of cathode depolarizer and anode.

A further object of the present invention is to provide low cost primary and secondary cells and batteries producing higher watt-hours per pound when used with preferred active anode materials such as lithium and sodium.

Another object is to provide a cell employing a nonaqueous system and utilizing soluble depolarizers.

These and other objects and advantages of the present invention will be apparent from the detailed exposition which follows.

[In our previous application, Ser. No. 678,476, filed Oct. 10, 1967, now abandoned and continued in Ser. No. 782,768, filed Dec. 10, 1968, now abandoned, we]

*In previous applications which resulted in U.S. Pat. No. 3,567,515, patented Mar 2, 1971, there was* disclosed an electrochemical cell which in its essential form comprised an anode of a metal capable of reducing sulfur dioxide, a cathode of a material substantially inert to sulfur dioxide but on which sulfur dioxide is reducible, said anode and cathode being immersed in a mixture of sulfur dioxide solution and an electrolyte salt substantially inert to sulfur dioxide and to the anode metal, wherein the sulfur dioxide solution was used as the cathode depolarizer.

We have now discovered that certain soluble compounds may be used as depolarizers instead of, or together with, sulfur dioxide. In either case, sulfur dioxide is employed as the solvent or as a cosolvent. Suitable soluble depolarizers are electroactive compounds having a relatively large size and having solubility in the cell electrolyte system (electrolyte, sulfur dioxide and solvent, and being inert thereto, and having a redox potential at least equal to or more oxidizing than sulfur dioxide. The depolarizers may be soluble in either the oxidized or reduced or both states and should have a solubility in the electrolyte system of at least $10^{-4}$ molar.

Various compounds are suitable such as aromatic amines, particularly tertiary aromatic amines, quinones, metal complexes of organic compounds and inorganic compounds. Such compounds include, for example, N,N,N',N'-tetramethyl benzidine; N,N,N',N'-tetramethyl diimoniumdiphenoquinone diperchlorate; 1,2-bis-julodinium ethylene diperchlorate; the tetra cation of N,N,N',N'-tetrakis - (p - diethylamino phenyl)-p-phenylenediamine; 1,10-phenanthroline ferrous perchlorate; bis-(ditrifluoromethyl ethylene dithiolato) No°; tris-(ditrifluoromethylene ethylene dithiolato) Cr°; bis-(ditrifluoromethyl ethylene dithiolato) Co°; tetracyano ethylene; sulfuryl chloride; and the like.

By "sulfur dioxide solution' 'is meant liquid sulfur dioxide (superatmospheric pressure or low temperature system) or a liquid cosolvent admixed with, e.g., substantially saturated by, gaseous sulfur dioxide at atmospheric pressure, or systems comprising mixtures of sulfur dioxide and cosolvent wherein the sulfur dioxide is substantially in excess, i.e., wherein the sulfur dioxide is the primary solvent, at superatmospheric pressure.

The anode is a metal or metallic material which is capable of reducing sulfur dioxide, i.e., the metal ion has less tendency than sulfur dioxide to accept electrons. Stated otherwise, the anode is any metal whose oxidized form is not reduced by the reduced form of sulfur dioxide or is a metal which exhibits a standard electrode potential (Gibbs-Stockholm electrode potential relative to the standard hydrogen electrode—SHE) greater, i.e., more reducing or less "noble," than that of sulfur dioxide. Particularly preferred is any metal which has a standard electrode potential of at least 0.2 volt more negative than that of sulfur dioxide in the non-aqueous systems herein described. Such standard electrode potentials conform to techniques of determination and sign convention having almost universal acceptance in the art as endorsed by the International Union of Pure and Applied Chemistry (1953) and as detailed in the Encyclopedia of Electrochemistry, Reinhold Publishing Company (1964), pages 429–431.

Suitable metals are those substantially inert to sulfur dioxide, i.e., do not chemically react with sulfur dioxide beyond formation of a "passivating" film on the surface of the metal nor do they substantially physically react with sulfur dioxide during the useful life of the battery so as to be dissolved, disintegrated or dispersed. By a "passivating" film is meant some form of metal-sulfur dioxide complex or reaction product (not wholly identifiable) which prevents substantial further attack of sulfur dioxide on the metal anode and chemical or physical (except electrochemical) interaction of anode metal with the electrolyte solution and soluble depolarizers contained therein.

This passivation is one of the unique advantages of the present invention since it permits elimination of the conventional separator or barrier between anode and cathode depollarizer. In addition, the passivating film operates in a manner similar to a conventional semi-permeable membrane since it remains porous to anodic ions and thus does not substantially impede the charge and discharge (electrochemical reduction and oxidation) of the anode metal.

Preferred anode metals are lithium, sodium, potassium and the alkaline earth metals such as beryllium, magnesium, calcium, strontium and barium. Of the foregoing, particularly preferred are lithium and sodium. Due to their activity and low equivalent weight, lithium and sodium provide the highest performance in watt-hours per pound weight of cell of all known materials. Moreover, these metals are substantially inert to sulfur dioxide and are passivated by sulfur dioxide as explained above. Less preferred metals are rubidium, cesium, aluminum and transition metals having reduction potentials in a non-aqueous system more negative than sulfur dioxide such as zinc, tin, manganese, chromium, gallium, indium and the like. It will be appreciated that the foregoing metals may be employed alone, in mixtures or alloys of two or more, or in other forms such as powders and compacts alone or over a conducting or semi-conducting substrate.

Cathode depolarizers in a secondary battery must have certain desirable characteristics. They must (1) undergo rapid, reversible electron transfer so as to minimize polarization and overvoltage (2) have long term compatibility with the other components of the battery and (3) have as high a potential and as low an equivalent weight as is practicably possible. Other requirements are imposed on the cathode depolarizer by the particular battery system employed. In most batteries, the cathode depolarizer must be insoluble in order to prevent direct chemical reaction with the anode (self discharge). Such reaction would lead to a lower operating potential as well as to a loss in capacity and shelf life. Because of the passivating film formed on lithium in an $SO_2$ containing solvent it is possible to employ a soluble cathode depolarizer without deterioration of the battery. The existence of this film, therefore, allows a much wider choice of oxidants since soluble materials are permitted. In fact, the use of a completely soluble cathode depolarizer has some advantages.

In order to provide electrical contact to an insoluble, generally non-conductive depolarizer, it is necessary to suspend it in a conductive matrix. Mass transport in the solid becomes a problem and most of the successful depolarizers are at least partially conductive. The use of a conductive matrix not only increases the effective cathode weight but also imposes the requirement of mechanical reversibility on the cathode. If after a discharge-charge cycle the structure of the cathode is significantly changed, the capacity of the battery as well as the ultimate lifetime will be reduced. These problems do not arise with an ideal soluble depolarizer, where both the oxidized and reduced forms are highly soluble. The major problem in this instance is diffusion of the depolarizer to the cathode surface where it is reduced and diffusion of the reduction product away from the cathode. In other words both the depolarizer and its reduction product must have sufficiently high mobility so that concentration polarization of the battery is relatively low at reasonable drain rates. The depolarizer may however be soluble in only one of the oxidized or reduced states. Thus, the soluble depolarizer concept is an extremely valuable one since a much greater latitude is allowed in the choice of potentially useful molecules.

The electrode is an integral part of the system and the properties of the depolarizer influence the type of electrode which must be employed. As mentioned above, the solubility properties of the depolarizer are important in determining the design of the cathode. If the solubility of the oxidized and reduced forms of the depolarizer are different, the cathode must accommodate this difference. The electrochemical properties of the cathode substrate are also important. The cathode substrate should be chemicallly inert in the potential range required in the operation of the cathode.

Cathode design may be either of two types depending on the solubility of the depolarizer and its reduction product formed during discharge of the cathode.

When both forms of the depolarizer are soluble the cathode material and its form are non-critical. In this case, the depolarizers may simply be added to the battery solution. The material of the cathode may be any which serves as a conductor of electrons and which is substantially inert to sulfur dioxide and to the depolarizer, i.e., which serves to transmit electrons to the depolarizer acting as an electron acceptor or oxidizing agent (in the sense of electron acceptor and not as donor of oxygen atoms to the cathode material by chemical reaction). By "substantially inert" is meant the substantial absence of chemical or physical (except electrochemical) interaction of the material with the depolarizer such as chemical oxidation, physical disintegration, dissolution, precipitation or coagulation during the useful life of the battery.

Preferred cathode materials for such soluble cathode product cells are metals of the platinum family including platinum, iridium, osmium, palladium, rhodium and ruthenium; carbon in any of its common electrode forms such as sintered, compacted or powdered graphite or carbon rod, alone or over platinum; iron in various forms, particularly as stainless steel; and nickel, silver, mercury, lead and gold. Less preferred materials are metals of the families of titanium, vanadium, chromium, manganese and iron (Groups IV B, V B, VI B, VIII B, and VIII of the Periodic Table); in alloys: copper, zinc, cadmium, germanium, tin, antimony and bismuth; certain nitrides such as boron nitride; and semi-conductors such as silicon-containing substances. These materials may take any of the many forms conventional in the art such as rods, compacts, powders, pastes, and the like.

When the depolarizer or its reduction product is less soluble, deposits may precipitate on the electrode surface and possibly block the cathode thereby preventing further reaction. Thus, under these conditions, high surface area cathode design is preferable in order to provide maximum capacity of the cathode. Moreover, where the oxidized state is less soluble, the depolarizer may be compounded together with the cathode material.

A high surface area cathode in combination with an alkali metal electrolyte offers other advantages where one of the depolarizer states is less soluble. For example, if the reduced form of the cathode depolarizer is insoluble, the discharge product is held on the electrode surface where it can be reoxidized on the charge cycle without the mass transfer limitations associated with soluble reduced products. This facilitates the rapid and efficient recharging necessary for operation of the cells as secondary systems.

It will be evident from the foregoing discussion that cathode materials may vary widely with choice being limited, in soluble cathode product systems, primarily only by the ability to conduct electrons and to transmit them to the depolarizer without substantially reacting with depolarizer during the useful life of the battery, and in insoluble cathode product systems, additionally by the form of the cathode material, i.e., it should have high surface area.

To obtain these advantages, any of the aforementioned cathode materials may be employed provided they are in a form in which surface area is maximized, e.g., at least about 0.1 square meter per gram. Hence, powders, pastes, sintered materials, and the like, will be preferred over plates, disks, screens or expanded metal structures. Particularly preferred are carbon in its many high surface area forms, e.g., graphite, acetylene black, carbon black, and amorphous carbon; powdered platinum, aluminum, nickel, tantalum and powdered or porous forms of cathode materials previously mentioned; and combinations of the foregoing, such as carbon paste over a screen of platinum, aluminum, or other conductor.

The preferred embodiment of the invention is, of course, a cell employing an alkali metal anode and an alkali metal electrolyte, particularly lithium or sodium.

The electrolyte salts employed in the practice of the present invention are salts which dissolve and dissociate in the sulfur dioxide solution and which are substantially inert to interaction with the electrode materials and with sulfur dioxide, such as chemical oxidation by sulfur dioxide or coagulation or precipitation by sulfur dioxide. Such salts are employed singly or in mixtures of two or more and in amounts sufficient for dissociation in the sulfur dioxide solution and to provide a useful specific conductivity. Specific conductivity, since it is a function of temperature as well as relative proportions of salt and sulfur dioxide solution, may vary widely. Generally, however, the specific, conductivity of the mixture of sulfur dioxide solution and electrolyte salt should be at least about $5\times10^{-5}\Omega^{-1}$ cm.$^{-1}$ at 22° C.

Electrolyte salts which are particularly preferred because of their exceptionally high conductivity, solubility in the sulfur dioxide solution and relative inertness to the electrode materials are lithium perchlorate and lithium halides, particularly lithium bromide. These electrode materials have been found to be particularly useful for reversible cells.

Also satisfactory as electrolytes are lithium salts of organic acids such as trichloroacetic, trifluoroacetic, boric, formic, paratoluene sulfonic acids, and lithium tetrafluoroborates, hexafluoroarsenates, hexafluorophosphates, hexafluorosilicates, monofluoroacetates, chloroaluminates and bromoaluminates.

Electrolyte salts having cations other than alkali metals an operable, but are less preferred. Such salts are for example tetraalkylammonium, particularly tetra(lower alkyl)ammonium, salts of halogens such as chlorine, fluorine, and bromine; tetraalkylammonium salts of organic acids such as trichloroacetic, trifluoroacetic, benzoic, formic, paratoluene sulfonic acid, and the like; and the tetraalkylammonium tetrafluoroborates, hexafluoroarsenates, hexafluorophosphates, hexafluorosilicates, monofluoroacetates, chloroaluminates, bromoaluminates, and perchloroates. Nonlimiting examples of such salts are tetraethylammonium chloride, tetraethylammonium acetate, tetrapropylammonium, tetrafluoroborate, tetrapropylammonium hexafluorosilicate and tetraethylammonium tetrachloroaluminate.

In addition, tetraalkylammonium and metal salts of organic acids such as oleic, oxalic, palmitic, propionic, stearic, succinic, valeric, cinnamic; other metal halides, metal cyanates and thiocyanates; metal sulfites and sulfamates; and metal nitrates, dicyanamides and tricyanomethides are suitable. The metal cation in the foregoing salts will preferably be an alkali or alkaline earth metal, provided the cathode has a large surface area. Also included but less preferred are sulfonium, arsonium and phosphonium salts such as trimethyl, triethyl and tripropyl sulfonium halides, acetates and the like.

As already mentioned, when an atmospheric pressure system is desired, cosolvent is used with gaseous sulfur dioxide to promote solubility and conductivity of the electrolyte salts. Generally, the cosolvent is substantially saturated with the gaseous sulfur dioxide. Such cosolvents must be stable to the sufur dioxide and the other components of the system such as the electrolyte salts and electrode materials.

Generally, solvents which satisfy these requirements are liquid organic and inorganic compounds which have electron rich centers, i.e., contain one or more atoms having at least one unshared pair of electrons, and which lack acidic hydrogen atoms. Such electron rich compounds are materials which contain atoms of elements of Groups $III_A$, $IV_A$, $V_A$ and $VI_A$ of the Periodic Table [Handbook of Chemistry and Physics, 44th Ed. (1963), pp. 448–449] as, for example, boron, silicon, nitrogen, phosphorus, oxygen and sulfur as well as combinations of these elements. Organic solvent molecules which are difunctional in these elements, i.e., contain two or more of the foregoing elements whether identical or different, are particularly suitable. By "acidic hydrogen atoms" is meant hydrogen atoms directly bonded to atoms of elements, except carbon, of the foregoing Periodic Groups. Thus, examples of excluded radicals would be OH, SH, PH and NH. Hence, piperidine would be excluded but N-methylpiperidine would be included as operable. Solvents which are strongly basic are not desirable.

The following classes of compounds exemplify organic cosolvents. These examples are, of course, nonlimiting since it will be immediately obvious that other solvents of these classes are substantially equivalent although some will be preferred over others due to a greater degree of solubility, etc. Mixtures of two or more of these solvents may likewise be employed.

Trialkyl borates: trimethyl borate, triethyl borate $$(C_2H_5O)_3B,$$

etc.;

Boronic acid esters: dimethyl boronate $C_2H_5B$ $$(OCH_2H_5)_2,$$

etc.;

Borinic acid esters: methyldiethyl borinate $$(C_2H_5)BOCH_3,$$

etc.;

Tetraalkyl silicates: tetramethyl silicate $(CH_3O)_4Si$, etc.;

Alkylalkoxy silanes: methyltrimethoxy silane $$CH_3Si(OCH_3)_3,$$

etc.;

Nitro alkanes: nitromethane, nitroethane, etc.;

Alkylnitriles: acetonitrile, propionitrile, isobutylronitrile, pivalonitrile, etc.;

Dialkyl amides: dimethylformamide $(CH_3)_2NCHO$, diethylformamide, etc.;

Lactams: N-methylpyrrolidinone also described as N-methyl-$\gamma$-butyrolactam, N-methyl-$\beta$-propiolactam, N-methyl-$\alpha$-valerolactam, etc.;

Tetraalkyl ureas: tetramethylurea $(CH_3)_2NCON(CH_3)_2$, etc.;

Acetals: dimethylacetal $CH_3CH(OCH_3)_2$, etc.;

Ketals: 2,2-dimethoxypropane $(CH_3O)_2C(CH_3)_2$, etc.;

Monocarboxylic acid ester: ethylacetate, ethylbutyrate, etc.;

Orthoesters: trimethylorthoformate $HC(OCH_3)$, triethylorthoacetate $CH_3C(OC_2H_5)_3$, etc.;

Lactones: $\gamma$-butyrolacetone, $\gamma$-valerolactone; etc.;

Dialkyl carbonates: dimethyl carbonate, diethyl carbonate, etc.;

Alkylene carbonates: ethylene carbonate, propylene carbonate, etc.;

Orthocarbonates: tetramethyl orthocarbonate, etc.;

Monoethers: dimethyl ether, diethyl ether, diisopropyl ether, n-butylether, the aliphatic monoethers disclosed as solvents in U.S. Pats. 2,019,832 and 2,171,867, etc.;

Polyethers: ethylene glycol diethyl ether, diethylene glycol diethyl ether, dimethoxytetraethyleneglycol, 1,2-dimethoxyethane (glyme), the aliphatic polyethers disclosed as solvents in U.S. Pats. 2,023,793 and 2,171,867, etc.

Cyclic ethers: tetrahydrofuran, 1,4-dioxane, tetrahydropyran, etc.;

Monocarboxylic acid anhydrides: acetic anhydride, propionic anhydride, etc.;

Dialkyl sulfates: dimethylsulfate, etc.;

Dialkyl sulfites: dimethylsulfite, etc.;

Alkylene sulfites: ethylene sulfite, propylene sulfite, etc.;

Dialkyl sulfinites: dimethylsulfite, etc.;

Alkyl sulfonates: methylethyl sulfonate $C_2H_5SO_2OCH_3$, etc.;

Nonlimiting examples of inorganic cosolvents are phosphorus oxychloride, thionyl chloride and sulfuryl chloride. Other such solvents are described in Audrieth and Kleinberg, Nonaqueous Solvents (1953), particularly at page 234, said text being incorporated herein by reference.

The relative proportions of sulfur dioxide, electrolyte salt, cosolvent and soluble depolarizer are a matter of choice depending on the solubility of the components in each other at a given temperature and pressure. Preferably, sufficient amounts of sulfur dioxide are employed to substantially saturate the cosolvent. The relative and total amounts of sulfur dioxide, cosolvent and electrolyte salt will be such as to substantially dissolve the electrolyte salt and to achieve substantial mutual solubility as well as to provide a useful specific conductivity. From about 0.01 to 5.0, preferably 0.1 to 2.0, molar solution of the electrolyte relative to the cosolvent will generally contribute to the requisite solubility and conductivity in combination with the sulfur dioxide solution. But obviously the concentration may be varied substantially according to the conductivities desired since specific conductivity is a function of temperature as well as concentration of materials in the solvent-electrolyte system.

When a cosolvent is employed, as in a room temperature-atmospheric pressure system, the cosolvent may be first saturated with the gaseous sulfur dioxide and the electrolyte salt added, or the salt may be dissolved in the cosolvent and sulfur dioxide bubbled through the mixture. Complete saturation with sulfur dioxide is not critical since for given electrolyte and cosolvent, concentrations of sulfur dioxide substantially less than saturation values at various temperatures and pressures contribute to a useful specific conductivity and cathode current density. Alternatively, systems containing amounts of sulfur dioxide greater than that required for saturation at atmospheric pressure may also be employed although such systems must be maintained at superatmospheric pressure. In general, amounts of sulfur dioxide from about 0.2 molar, relative to the cosolvent, up to saturation at a given temperature will be useful.

Alternatively, the use of a cosolvent may be avoided by employing liquid sulfur dioxide under the requisite superatmospheric pressure or at a liquefying temperature and atmospheric pressure. Such a system is advantageous due to the greater proportion of sulfur dioxide utilized per unit volume and weight of cell and more intimate contact of the sulfur dioxide with the cathode. Substantially the same relative and total amounts of liquid sulfur dioxide and electrolyte salt will be employed as described above with reference to the atmospheric pressure-dissolved sulfur dioxide system. If desired, a cosolvent may also be employed in this system to aid conductivity and dissolution of electrolyte salt but such, of course, is not required.

The amount of soluble depolarizer may vary widely but will generally provide cathode capacity about equal to anode capacity.

In the construction of the cells or batteries of the invention, a large variety of cell enclosure materials is available, including inert materials such as glass, high density polyethylenes, polypropylenes, polytetrafluoroethylenes or the like. The cell is generally constructed so as to permit maintaining an inert atmosphere within the cell closure while excluding atmospheric moisture, nitrogen and oxygen. Inert gases such as argon, xenon and helium may be used for this purpose. Conventional means are provided for the addition and exit of the desired gases and for the insertion of the electrodes. The electrodes are constructed of the conductive materials noted above. In a typical embodiment, the anode is inserted as a coil, plate or sheet of metal or it may be a bed of a saturated metal amalgam. When a superatmospheric pressure system is desired, the enclosure, of course, will be maintained pressure-tight at the required liquefying pressure for sulfur dioxide.

Other aspects of cell construction such as the geometry of arrangement of electrodes within the cell closure and size of electrodes are routine considerations and form no part of the present invention.

The cells or batteries of the invention may also be constructed as so-called "reserve" cells or batteries. These are power supplies which are manufactured and then stored in a form that insures inertness until a specific action is taken by the user or that results automatically from the application. In a simple form, the electrolyte may be separated from the battery plates and later added when activation is desired. Activation of such reserve cells or batteries may be effected in other known ways. For example, activation may be manual as by simple immersion of the electrodes in the sulfur dioxide-electrolyte mixture or by hypodermic filling of a cell or battery with sulfur dioxide and/or electrolyte. Activation may be provided automatically as well, as from a condition of use, e.g., from the linear acceleration resulting from missile launching or gun firing of a projectile which provides the energy to break an electrolyte ampule. The nature of reserve battery systems as well as descriptions of particular forms of such systems are described, for example, in The Encyclopedia of Electrochemistry, C. A. Hampel, editor, Reinhold Publishing Corporation (1964), pages 76–81. This publication is incorporated herein by reference. Many other variations of cell or battery design will at once become obvious to those skilled in the art in view of the present disclosure and the invention is not, of course, limited to any one design.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLES I TO XVI

Suitable cells were constructed in conventional fashion using a cylindrical glass vessel closed with a rubber stopper through which are sealed connectors for the anode and cathode and means for admitting sulfur dioxide and inert gas. The clean, dry cell was placed in an argon-filled dry box where the electrodes were prepared and the dried electrolyte added to the cell. The cosolvent, if employed, was then introduced into the cell. The cell was thereafter removed from the dry box and sulfur dioxide gas was passed through the solution until the desired amount collected in the cell. The performance of the cell was tested by connecting a voltmeter to the output terminals and an ammeter and variable load resistor in series with the cell.

The examples were performed in cells of 2–5 ml. volume in order to keep the amount of material used and the time required to a minimum. Each cell was fitted with a cathode, lithium anode and reference, and an $SO_2$ inlet and outlet. A Dacron® separator was used to prevent shorting of the electrodes. The soluble depolarizers were simply placed in the cell, propylene carbonate and $LiClO_4$ added and the cell attached to the line for introduction of $SO_2$. Insoluble depolarizers were formed into an electrode which was fitted to the cell and then treated in the same manner as above.

Three different kinds of cathodes were used:

(1) Nickel plaque

This is finely divided nickel sintered onto a nickel screen. The free space is about 80% and the material has a surface area of about 600 cm.²/gm. This type of electrode is poor for insoluble depolarizers unless they can be precipitated into the plaque by impregnation techniques.

(2) Compressed nickel

An intimate mixture of the depolarizer and finely divided (6–10$\mu$) nickel was compressed on a nickel screen at ~15,000 p.s.i. This produces a metallic appearing electrode which may not be sufficiently porous; a factor affecting the utilization of the depolarizer.

(3) Porous carbon

A hole is drilled partially through a porous carbon block, depolarizer is packed into the hole and a graphite rod force fitted into the hole. The graphite rod provides mechanical support and electrical contact to the cathode. After the cathode is placed in the cell, the solvent distributes the depolarizer throughout the carbon block. This type of electrode is suitable only if the depolarizer is somewhat soluble so that permeation of the electrode can occur. In order to minimize loss of material by diffusion from the cathode, the carbon block is large enough to almost completely fill the cell.

The results obtained on a variety of depolarizers is given in the examples, summarized in Table I. Two criteria of cathode performance are given: utilization and efficiency. Utilization is defined as the percentage of the depolarizer which will undergo electrochemical reaction and is usually measured by the faradays passed during charge. When a cathode is prepared in the charged state the initial discharge is also a measure of utilization, although it is listed under the column headed "Efficiency." Efficiency is 100 times the ratio of the faradays passed during discharge to the faradays passed during charge of the same cycle. If the current during charge and discharge is the same, the efficiency can be calculated from the elapsed time during each one-half cycle. A recording of potential vs. time at constant current usually showed definite breaks. The appearance of these breaks marked the end of the half cycle and the time at which they occurred is given in Table I. Where a break did not occur the total time for each one-half cycle is given.

TABLE I.—CELL RESULTS

Solvent: Propylene carbonate—$SO_2$ (Sat.)
Electrolyte: $LiClO_4$ (1 M)
Anode: Li 1 x 1.5 cm.
Reference: Li

| | | Solubility | | | | Charge | | | | | Discharge | | | |
|---|---|---|---|---|---|---|---|---|---|---|---|---|---|---|
| | Depolarizer [1] [M] | Oxidized form | Reduced form | Electrode | Cycle | Current, ma. | Potential, v. | Time, sec. | Utilization, percent | O.C.P., v. | Current, ma. | Potential, v. | Time, sec. | Efficiency [10] percent |
| Example: | | | | | | | | | | | | | | |
| I | TMB (0.177) | Sol. ~0.1 M | INS | Carbon block | 1 | 10 | 3.1–3.9 | 3,500 | 36 | 3.8 | 10 | 3.7–2.9 | 2,900 | 80 |
| | | | | | 3 | 20 | 3.1–3.85 | 2,175 | 45 | 3.75 | 20 | 3.7–2.9 | 1,950 | 90 |
| | | | | | [2] 1 | | | | | | | | | [10] 33 |
| | | | | | [2] 2 | | | | | | | | | 44 |
| | | | | | [2] 3–5 | | | | 42 | | | | | 75.90 |
| II | DDQ (1.0) | Sol. ~0.1 M | INS | do | 6 | | | | | | 10 | 4.0–2.9 | 2,000 | |
| | | | | | 7 | 20 | 3.0–4.1 | 1,000 | 34 | [3] 3.9–3.6 | 5 | 3.6–2.9 | 3,000 | 44 |
| | | | | | | 10 | 3.95–4.15 | 900 | | | | | | |
| | | | | | | 5 | 4.0–4.05 | 1,000 | | | | | | |
| | | | | | 8 | 20 | 2.9–4.1 | 1,300 | 44 | 3.9 | 5 | 3.9–2.9 | 6,400 | 75 |
| | | | | | | 10 | 4.0–4.1 | 1,100 | | | | | | |
| | | | | | | 5 | 4.0 | 1,000 | | | | | | |
| III | DJE (1.3) | Sol | | Ni plaque | 2 | | | | | 3.10 | 5 | 2.85–2.0 | 60 | [10] 0.3 |
| | | | | | 2 | 5 | 2.75–4.1 | 120 | 0.6 | 3.15 | 5 | 2.9–2.1 | 60 | 50 |
| IV | DJE (1.0) | Sol | Sol | Carbon block | 1 | | | | | | 5 | 2.95–2.70 | | [10] 15 |
| | | | | | 2 | 5 | 3.1 | 2,070 | 11 | 3.00 | 5 | 2.95–2.65 | 1,000 | 48 |
| | | | | | 4 | 20 | 3.5–4.6 | 1,000 | 22 | [4] 3.9–3.5 | 5 | 2.9–2.7 | 2,100 | 53 |
| V | H-117 0.18 | Sol | Sol | Compressed Ni | 1 | 5 | | | 63 | 3.5–3 | 5 | | | 40–50 |
| | | | | | 3 | 5 | | | 16 | | 5 | | | 40–50 |

See footnotes at end of table.

TABLE I—Continued

| | Depolarizer [1] [M] | Solubility: Oxidized form | Solubility: Reduced form | Electrode | Cycle | Charge: Current, ma. | Charge: Potential, v. | Charge: Time, sec. | Charge: Utilization, percent | Charge: O.C.P., v. | Discharge: Current, ma. | Discharge: Potential, v | Discharge: Time, sec. | Discharge: Efficiency [10] percent. |
|---|---|---|---|---|---|---|---|---|---|---|---|---|---|---|
| Example: | | | | | | | | | | | | | | |
| VI | PFP | Sol | Sol | Ni plaque | 1 | 5 | 3.85–4.6 | 1,600 | 8 | | 5 | 3.85–2.8 | 700 | 44 |
| | | | | | 2 | 5 | 3.5–4.25 | 1,000 | 5 | | 5 | 3.85–2.5 | 750 | 75 |
| | | | | | 3 | 5 | 3.3–3.9 | 600 | 3 | | 5 | 3.85–2.5 | 500 | 80 |
| | | | | | 4 | 5 | 3.6–4.0 | 2,000 | 10 | | 5 | 3.9–2.4 | 350 | 175 |
| | | | | | 5 | 8–2 | 4.0 | | 13 | | 5 | 3.85–2.3 | 800 | 30 |
| VII | PFP (1.05) | Sol | Sol | do | 1 | 5 | 3.6–3.95 | 1,200 | 6 | 3.9 | 5 | 3.8–2.1 | 810 | [5] 66 |
| | | | | | 2 | 5 | 3.6–3.95 | 1,200 | 6 | 3.9 | 5 | 3.8–2.1 | 720 | [6] 60 |
| | | | | | 3 | 5 | 3.6–3.95 | 1,200 | 6 | 3.9 | 5 | 3.8–2.0 | 540 | [7] 45 |
| | | | | | 4 | | 4.0 | | 13 | | 5 | 3.85–2.2 | 630 | 25 |
| VIII | Ferrocene (2.1) | Sol | Sol | do | 1 | 5 & 10 | <4.0 | | 22 | | 5 | | | 37 |
| | | | | | 2 | 10 | 3.2–3.4 | 1,020 | 5 | | 10 | 3.1–2.8 | 720 | 70 |
| | | | | | 3 | 20 | 3.15–4.1 | 520 | 5 | | 10 | 3.1–2.85 | 600 | 59 |
| | | | | | 6–7 | 10 | 3.2–3.85 | 1,000 | 5 | | 10 | 3.2–2.7 | 900 | 90 |
| | | | | | 8 | 10 | 3.2–3.65 | 1,000 | 5 | | 10 | 3.2–2.7 | 800 | [8] 80 |
| | | | | | 9 | 5 | 3.15–4.1 | 8,500 | 20 | | 5 | 3.3–2.8 | 6,500 | 77 |
| IX | $Ni[S_4C_4(CF_3)_4]$ (0.25) | INS | Sol | Compressed Ni | 1 | | | | | 3.7 | 5 | 3.7–2.8 | 5,000 | [10] 100 |
| | | | | | 2 | 5 | 3.4–3.6 | 2,400 | 50 | | 5 | 3.7–2.6 | 200 | 6 |
| X | $Ni[S_4C_4(CF_3)_4]$ (0.21) | INS | Sol | Carbon block | 1 | | | | | 3.6 | 10 | 3.4–3.0 | 1,900 | [10] 85 |
| | | | | | 2 | 10 | 3.1–3.6 | 1,900 | 85 | | 10 | 3.5–3.0 | 670 | 38 |
| XI | $NiS_4C_4(CF_3)_4$ (0.28) | | | Compressed Ni | 1 | | | | | 3.6 | 5 | 3.5–3.0 | 1,500 | [10] 30 |
| | | | | | 2 | 5 | 3.6–4.1 | 1,200 | 25 | | 5 | 3.5–3.0 | 720 | 48 |
| | | | | Ni plaque | 7 | 5 | 3.4–4.0 | 870 | 18 | | 5 | 3.6–3.0 | 540 | [8] 65 |
| | | | | | 8 | 5 | 3.1–4.1 | 900 | 20 | | 5 | 3.6–3.0 | 700 | 77 |
| | | | | | 11 | 5 | 3.1–4.1 | 1,700 | 36 | | 5 | 3.6–3.0 | 510 | 30 |
| | | | | | 12 | 5 | 2.9–4.1 | 1,550 | 31 | | 5 | 3.6–3.0 | 550 | 30 |
| XII | $Cr[S_6C_6(CF_3)_6]$ (.103) | INS | Sol | Compressed Ni | 1 | | | | | | 5 | 3.3–2.85 | 1,500 | [10] 75 |
| | | | | Ni plaque | 2 | 5 | 3.3–3.9 | 1,500 | 75 | 3.5 | 5 | 3.3–2.8 | 660 | 44 |
| | | | | | 3 & 4 | 5 | 3.5–3.95 | 725 | 37 | 3.6 | 5 | 3.4–2.8 | 540 | 74 |
| | | | | | 5 | 5 | 3.3–4.0 | 2,100 | 100 | | 5 | 3.7–2.9 | 800 | 40 |
| XIII | $Cr[S_6C_6(CF_3)_6]$ (.108) | | | Carbon block | 1 | 10 | 3.4–3.9 | 1,625 | ([9]) | 3.8 | 10 | 3.8–3.1 | 3,000 | ([9]) |
| | | | | | 2 | 20 | 3.35–4.1 | 4,500 | ([9]) | | 20 | 3.8–3.2 | 3,000 | ([9]) |
| XIV | $CoS_4(CF_3)_4$ (1.1) | INS | Sol | Ni plaque | 1 | | | | | 3.65 | 5 | 3.2–2.9 | 4,800 | [10] 22 |
| | | | | | 2 | 5 | 3.4–4.1 | 1,500 | 7 | 3.7 | 5 | 3.5–2.9 | 1,350 | 90 |
| | | | | | 3 | 5 | 3.2–4.0 | 1,700 | 8 | 3.7 | 5 | 3.5–2.9 | 1,410 | 83 |
| | | | | | 6 | 5 | 3.25–3.85 | 1,800 | 9 | 3.7 | 5 | 3.4–2.9 | 720 | 40 |
| XV | $CoS_4C_4(CF_3)_4$ | | | Carbon block | 1 | | | | | 3.45 | 5 | 3.35–3.0 | 11,580 | [10] 56 |
| | | | | | 2 | 5 | 3.3–3.4 | 2,000 | 10 | 3.3 | 5 | 3.3–2.95 | 1,680 | 84 |
| | | | | | 5 | 20 | 3.55–4.1 | 3,600 | 72 | 3.70 | 5 | 3.4–3.0 | 2,820 | 19 |
| | | | | | 6 | 10 | 3.4–3.8 | 2,000 | 20 | 3.65 | 5 | 3.6–3.0 | 2,280 | 57 |
| | | | | | 7 | 10 | 3.4–3.65 | 1,475 | 15 | 3.50 | 5 | 3.35–3.0 | 2,340 | 80 |
| XVI | TCNE (2.4) | Sol | Sol | Ni plaque | 1 | | No charge | | | | 5 | 3.15–3.0 | 5,000 | [10] 10.4 |

[1] Symbols for depolarizer: TMB=N, N, N′, N′-tetramethyl benzidine; DDQ=N, N, N′, N′-tetramethyl di-imoniumdiphenoquinone diperchlorate (di—cation of TMB); DJE=1, 2-bis-julolidinium ethylene diperchlorate; H-117=Tetra cation of N, N, N′, N′-tetrakis-[p-diethylamino phenyl]-p-phenylenediamine; PEP=1, 10-phenanthroline ferrous perchlorate; $Ni_1S_4C_4(CR_3)_4$=Bis-[ditrifluoromethyl ethylene dithiolato] Ni°; $CrS_6C_6(CF_3)_6$=Tris-[ditrifluoromethyl ethylene dithiolato] Co°; $CoS_4C_4(CF_3)_4$=Bis-[ditrifluoromethyl ethylene dithiolato] Co°; TCNE=Tetra cyano ethythylene.

[2] The first cycles were low because the depolarizer had not soaked in the carbon block.

[3] Decreased over a 15,7-hour period, Delay caused a decrease in efficiency.

[4] Decreased over a 0.5-hour period.

[5] Discharge after 1-minute delay.

[6] Discharge after 16-minute delay:

[7] Discharge after 46-minute delay:

[8] Discharge after 30-minute delay.

[9] Simultaneous substrate oxidation prevented measurement of a meaningful utilization figure.

[10] Utilization rather than efficiency.

EXAMPLE XVII

This example illustrates the use of an inorganic soluble depolarizer, sulfuryl chloride.

The cell solution was IM $LiClO_4$ in propylene carbonate and $SO_2$ together with sulfuryl chloride. A lithium anode and a 2 cm.$^2$ nickel plaque cathode were employed. The cell, at a concentration of depolarizer of 3.3 M, gave an open circuit voltage of 3.5 volts and delivered 10 ma./cm.$^2$ at 2.9 to 3.5 volts for 2200 seconds.

It is understood that although all of the cells and batteries of the invention as described and as illustrated by the foregoing examples are effective for various applications without electrode separator materials, the invention also contemplates and includes cells and batteries in which it may be desirable to employ the conventional electrode separator materials such as are described hereinabove to achieve mechanical separation.

Moreover, in addition to completely nonaqueous systems, the invention is intended to include cells and batteries wherein minor amounts of water are present in the mixture of electrolyte salt and sulfur dioxide solution (and cosolvent if desired) since, in practice, it is often difficult to achieve a completely nonaqueous state. The cells and batteries of the invention therefore may be described as being substantially non-aqueous, i.e., as containing no more than the minor amount of water which can be tolerated without harming the anode or other elements of the system.

We claim:

1. A nonaqueous electrochemical current producing cell comprising, in combination an alkali metal anode, a porous electroconductive inert solid cathode permeable by the electrolyte liquid and a nonaqueous liquid electrolyte contacting said anode and cathode, said liquid comprising (i) a solvent which comprises sulfur dioxide *and an organic liquid co-solvent,* (ii) a dissolved electrolyte salt inert to sulfur dioxide, and (iii) a dissolved cathode depolarizer having redox potential more oxidizing than sulfur dioxide.

[2. A nonaqueous electrochemical cell defined by claim 1 wherein said liquid electrolyte further comprises an organic liquid co-solvent.]

3. A cell defined by claim 1 wherein said anode metal is lithium.

4. A cell defined by claim 1 wherein said dissolved depolarizer is an electroactive tertiary aromatic amine.

5. A cell defined by claim 4 wherein said soluble depolarizer is N,N,N',N'-tetramethyl benzidene.

6. A cell defined by claim 4 wherein said dissolved depolarizer is N,N,N',N'-tetramethyl di-imoniumdiphenoquinone diperchlorate.

7. A cell defined by claim 1 wherein said electrolyte salt is a lithium halide.

8. A cell defined by claim 7 wherein said halide is lithium bromide.

9. A cell defined by claim 1 wherein said electrolyte salt is lithium perchlorate.

References Cited

The following references, cited by the Examiner, are of record in the patented file of this patent or the original patent.

UNITED STATES PATENTS

| | | | |
|---|---|---|---|
| 3,393,093 | 7/1968 | Shaw et al. | 136—6 |
| 2,897,249 | 7/1959 | Glicksman et al. | 136—137 X |
| 3,121,028 | 2/1964 | Story | 136—6 |
| 3,248,265 | 4/1966 | Herbert | 136—6 |
| 3,279,952 | 10/1966 | Minnick | 136—100 |
| 3,423,242 | 1/1969 | Meyers et al. | 136—6 |
| 3,542,602 | 11/1970 | Gabano | 136—155 |
| 3,567,515 | 3/1971 | Maricle et al. | 136—6 |
| 2,554,447 | 5/1951 | Sargent | 136—100 |
| 2,874,204 | 2/1959 | Morehouse et al. | 136—100 |
| 3,043,896 | 7/1962 | Herbert et al. | 136—6 |
| 3,125,467 | 3/1964 | Lawson et al. | 136—83 |

OTHER REFERENCES

Journal of the Electrochemical Society, vol. 94, pp. 299–308, Schaschl, E., et al., A Low Temperature Liquid Sulfur Dioxide Battery, 1948.

ANTHONY SKAPARS, Primary Examiner

U.S. Cl. X.R.

136—83 R, 100 R, 137, 154